US011873785B1

United States Patent

(12) United States Patent
Milton et al.

(10) Patent No.: US 11,873,785 B1
(45) Date of Patent: Jan. 16, 2024

(54) VEHICLE COOLANT CIRCUITS INCLUDING JET MANIFOLDS

(71) Applicant: GM GLOBAL TECHNOLOGY OPERATIONS LLC, Detroit, MI (US)

(72) Inventors: Jeffery J Milton, Clarkston, MI (US); Chung Y. Wei, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 18/098,201

(22) Filed: Jan. 18, 2023

(51) Int. Cl.

| | |
|---|---|
| ***F02M 26/28*** | (2016.01) |
| ***F02M 26/32*** | (2016.01) |
| ***F01P 7/16*** | (2006.01) |

(52) U.S. Cl.
CPC ............. *F02M 26/28* (2016.02); *F01P 7/165* (2013.01); *F02M 26/32* (2016.02)

(58) Field of Classification Search
CPC ........ F02M 26/28; F02M 26/33; F02M 26/32; F02M 26/22; F02B 29/0418; F02B 29/0443; F01P 2007/143; F01P 2007/146
See application file for complete search history.

(56) References Cited

U.S. PATENT DOCUMENTS

| | | | | |
|---|---|---|---|---|
| 9,448,091 | B2 * | 9/2016 | Woodsend | F02D 21/08 |
| 2015/0047317 | A1 * | 2/2015 | Ulrey et al. | F02B 47/08 |
| 2020/0063640 | A1 * | 2/2020 | Lee | F01P 7/165 |

FOREIGN PATENT DOCUMENTS

| | | | | |
|---|---|---|---|---|
| DE | 102020108393 A1 * | 9/2021 | | |
| WO | WO-2011136717 A1 * | 11/2011 | | F02B 29/0412 |

* cited by examiner

*Primary Examiner* — George C Jin
*Assistant Examiner* — Teuta B Holbrook

(57) ABSTRACT

A cooling circuit includes vehicle components and a jet manifold. The vehicle components are configured to receive coolant and include a first vehicle component and a second vehicle component. The jet manifold includes a first input, a second input and a nozzle. The first input is configured to receive coolant from the first vehicle component. The second input is configured to receive coolant from the second vehicle component. The nozzle is configured to increase pressure of the coolant received at the first input to generate a jet stream and a low-pressure zone in a cavity of a body of the jet manifold, the low-pressure zone created by the jet stream drawing coolant from the second input.

20 Claims, 5 Drawing Sheets

VEHICLE COOLANT CIRCUITS INCLUDING JET MANIFOLDS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to coolant circuits of vehicles.

A vehicle may include an internal combustion engine and a coolant circuit for cooling the engine. The coolant circuit may include a water pump, a radiator, a surge tank, the engine and a heater core. The coolant circuit may further include an exhaust gas recirculation (EGR) valve, one or more intercoolers, and/or an oil cooler. The coolant is cooled by the radiator and absorbs thermal energy in the engine, EGR valve and intercoolers. Thermal energy in the coolant may be used to heat an interior of the vehicle via the heater core.

SUMMARY

A cooling circuit is disclosed and includes vehicle components and a jet manifold. The vehicle components are configured to receive coolant and include a first vehicle component and a second vehicle component. The jet manifold includes a first input, a second input and a nozzle. The first input is configured to receive coolant from the first vehicle component. The second input is configured to receive coolant from the second vehicle component. The nozzle is configured to increase pressure of the coolant received at the first input to generate a jet stream and a low-pressure zone in a cavity of a body of the jet manifold, the low-pressure zone created by the jet stream drawing coolant from the second input.

In other features, the first input receives a high-pressure fluid from the first vehicle component. The second input receives a low-pressure fluid from the second vehicle component, where the low-pressure fluid is at a lower pressure than the high-pressure fluid.

In other features, the first vehicle component is an exhaust gas recirculation valve. The second vehicle component is a heater core.

In other features, the first vehicle component is a heater core. The second vehicle component is one of an exhaust gas recirculation valve and an oil cooler.

In other features, the vehicle components include at least two of: an exhaust gas recirculation valve; a heater core; and an oil cooler.

In other features, the nozzle has an inner diameter that decreases in size from an inlet of the nozzle to an outlet of the nozzle.

In other features, the jet manifold includes a venturi downstream from the cavity, the venturi being configured to reduce a pressure of the coolant received from the cavity.

In other features, at least one of i) an inner diameter of the jet manifold increases from an output of the venturi, and ii) a thickness of a wall of the jet manifold decreases from the output of the venturi to recover some pressure and prevent cavitation.

In other features, at least one of: an inner diameter of the jet manifold decreases to the venturi and increases from an output of the venturi; and a thickness of a wall of the jet manifold increases to the venturi and decreases from an output of the venturi.

In other features, the jet manifold includes an output that supplies coolant to a pump.

In other features, the jet manifold includes two or more inputs and a single output.

In other features, the jet manifold includes three or more inputs and a single output.

In other features, the jet manifold includes a third input configured to receive coolant from a third vehicle component. The jet stream creates another low-pressure zone in a cavity of the body of the jet manifold at the third input, the another low-pressure zone created by the jet stream draws coolant from the third input.

In other features, the jet manifold includes a venturi downstream from the second input or the third input.

In other features, the first input is at a first end of the jet manifold and directs fluid in a same direction as fluid flow out of the jet manifold. Fluid flow into the second input is perpendicular to the direction of fluid flow into and from the first input.

In other features, a cooling circuit is provided and includes an exhaust gas recirculation valve, a heater core, and a jet manifold. The jet manifold includes a first input, a second input, a nozzle and a venturi. The first input is configured to receive coolant from the exhaust gas recirculation valve. The second input is configured to receive coolant from the heater core. The nozzle is configured to increase pressure of the coolant received from the exhaust gas recirculation valve to generate a jet stream and a low-pressure zone in a cavity of a body of the jet manifold. The low-pressure zone is created by the jet stream drawing coolant from the second input. The venturi is downstream from the cavity.

In other features, the jet manifold includes a third input downstream from the second input and configured to receive coolant from a vehicle component. The vehicle component is different than the exhaust gas recirculation valve and the heater core.

In other features, a cooling circuit is provided and includes a heater core, an exhaust gas recirculation valve, and a jet manifold. The jet manifold includes a first input, a second input, a nozzle and a venturi. The first input is configured to receive coolant from the heater core. The second input is configured to receive coolant from the exhaust gas recirculation valve. The nozzle is configured to increase pressure of the coolant received from the heater core to generate a jet stream and a low-pressure zone in a cavity of a body of the jet manifold. The low-pressure zone created by the jet stream draws coolant from the second input. The venturi is downstream from the cavity.

In other features, the jet manifold includes a third input downstream from the second input and configured to receive coolant from a vehicle component. The vehicle component is different than the exhaust gas recirculation valve and the heater core.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
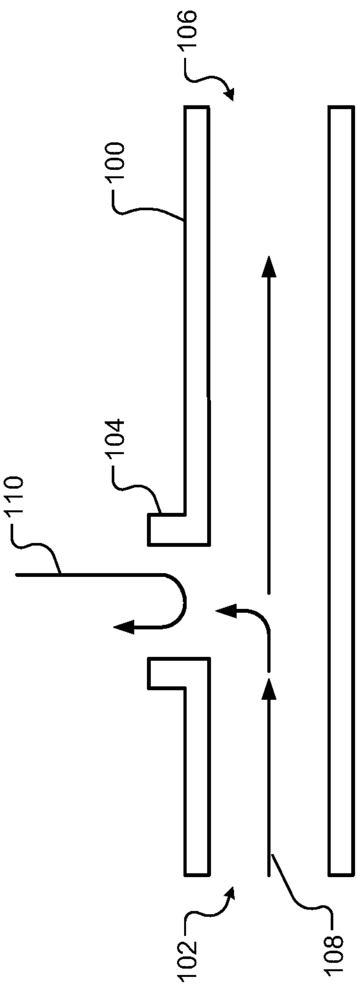
FIG. 1 is a side cross-sectional view of a coolant manifold.

Unequal pressures in an engine coolant system from various sources can cause unintended flow in improper directions. For example, flow from a high-pressure line could cause backflow in a low-pressure line when the two flows are combined at a junction. As an example, a cooling circuit of a vehicle may include a manifold that receives coolant from two or more devices and directs the coolant to, for example, a water pump. FIG. 1 shows an example cooling manifold 100 having two inputs 102, 104 and a single output 106. A high-pressure flow of fluid (e.g., coolant), represented by arrow 108 is received at the input 102. A low-pressure flow of fluid (e.g., coolant), represented by arrow 110, is received at the input 104. Inner diameters of the inputs 102, 104 and the output 106 do not vary for the lengths of the inputs 102, 104 and output 106. The inner diameter of the input 102 may be the same as the inner diameter of the output 106. The high-pressure flow of coolant that passes through the cooling manifold 100 causes backflow in the input 104, as represented by arrow 110. This can prevent flow of coolant through one or more devices. For example, this may prevent flow of coolant through a heater core, which can reduce the amount of heating provided by the heater core and/or cause overheating of the heater core. To overcome this issue, a more complex coolant circuit may be created that includes a bypass valve and other connectors, conduits, jumpers, and/or other components, which increases costs and potential for leaks.

The examples set forth herein include cooling circuits including one or more jet pumps (also referred to as jet manifolds). Each of the jet manifolds includes an input nozzle that creates a jet stream within the jet manifold. The jet stream is provided across one or more other inputs and creates one or more low-pressure zones within the jet manifold. The low-pressure zone(s) draw fluid (e.g., coolant) from the one or more other inputs and thus prevent backflow in the one or more other inputs. The use of the jet manifolds prevents incorporating more complex cooling circuits including various connectors, conduits, valves, jumpers, etc. The more complicated cooling circuits are i) more expensive due to the increased complexity and increased number of parts, and ii) more prone to leaks than the examples disclosed herein due to the increased number of connections. Incorporation of the jet manifolds aids in balancing fluid flows.

Figure 2:
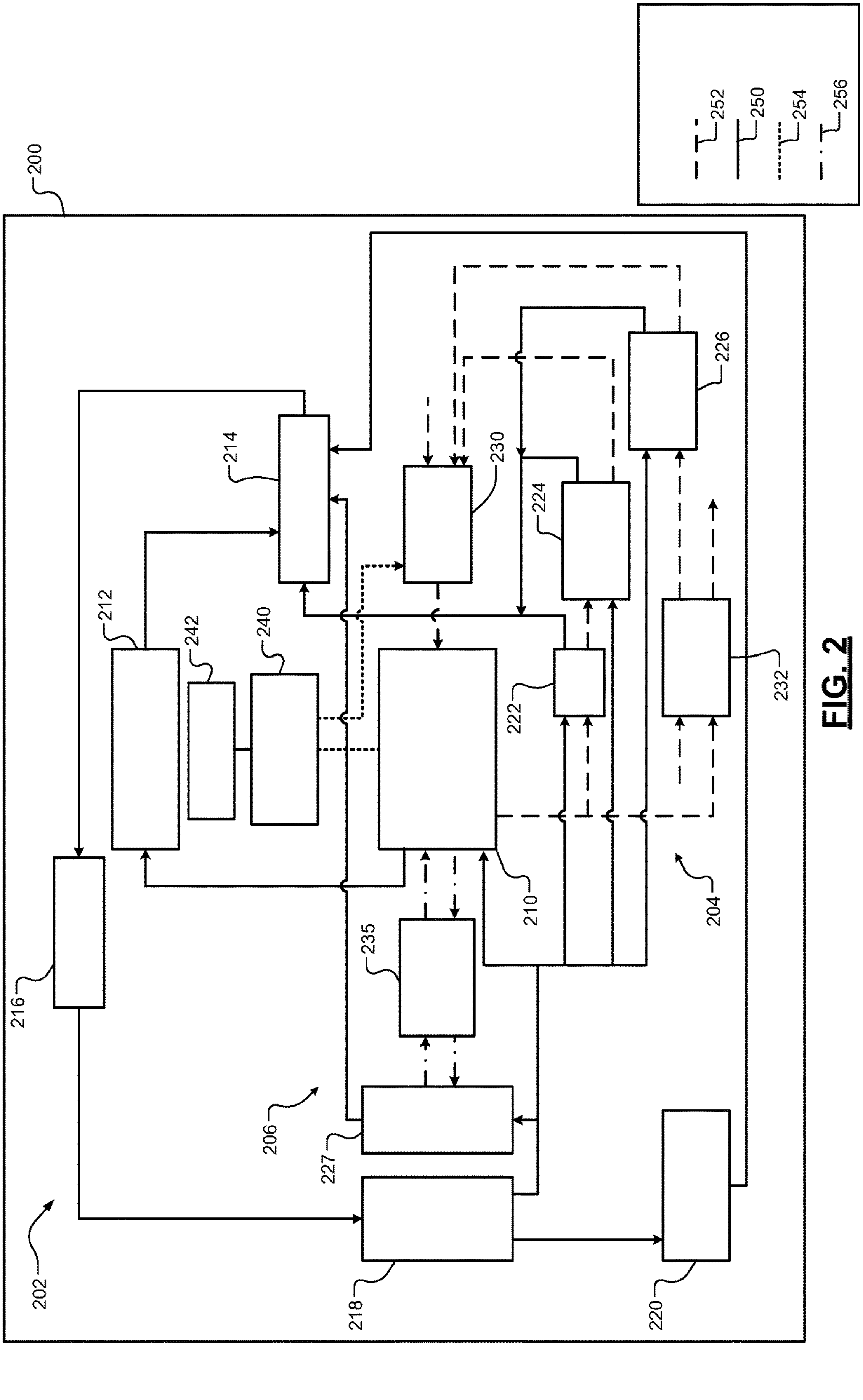
FIG. 2 is a functional block diagram of a vehicle including an example cooling circuit with a jet manifold in accordance with the present disclosure.
Figure 6:
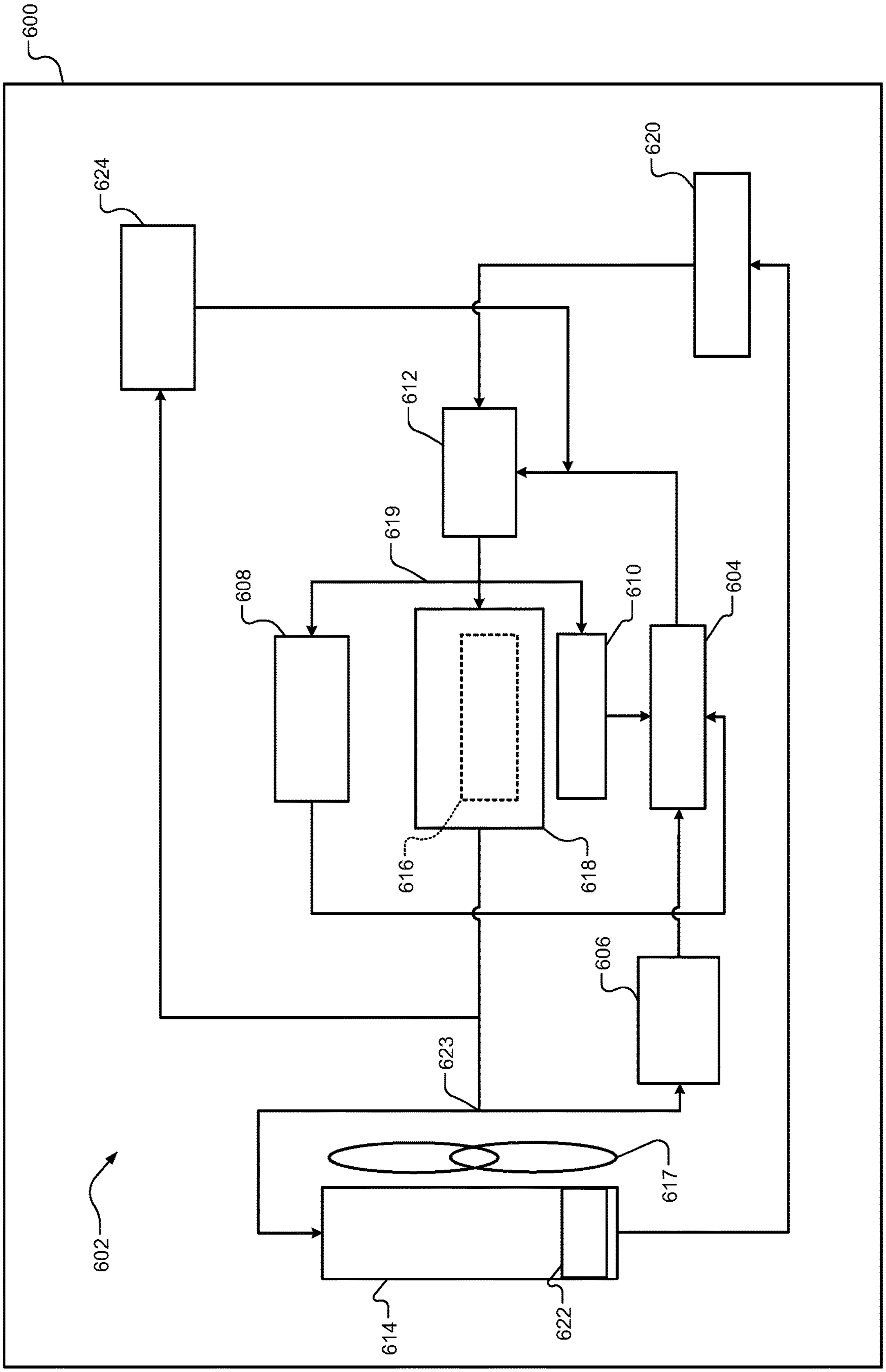
FIG. 6 is a functional block diagram of a vehicle including another example cooling circuit with a jet manifold in accordance with the present disclosure.

The jet manifolds disclosed herein may be implemented in various different coolant circuits, a couple of examples of which are shown in FIGS. 2 and 6. The cooling circuits may have different arrangements. The arrangements of FIGS. 2 and 6 are provided as examples, the jet manifolds may be implemented in other circuit arrangements. Also, although the arrangements of FIGS. 2 and 6 include components and devices connected in a certain order, the components and devices may be connected in a different order.

FIG. 2 shows a vehicle 200 including a cooling circuit 202, an air flow circuit 204, and an oil cooling circuit 206. The cooling circuit 202 may include an engine 210, a heater core 212, a jet manifold 214, a water pump 216, a radiator 218, and a surge tank 220. The cooling circuit 202 may further include an EGR valve 222 and intercoolers 224, 226.

The jet manifold 214 may have two or more inputs to receive coolant from two or more vehicle components and one or more outputs to supply coolant to one or more other vehicle components. For example, the jet manifold 214 may receive coolant from, for example, the EGR valve 222, the heater core 212, and the surge tank 220. The jet manifold 214 may also receive coolant from an oil cooler 227 of the oil cooling circuit 206. The jet manifold 214 then outputs the received coolant to the water pump 216. High-pressure flow is generated within the jet manifold 214 to provide low-pressure zone(s) for drawing low-pressure coolant from one or more inputs receiving coolant respectively from the heater core 212, surge tank 220, EGR valve 222, and oil cooler 227. The jet manifold 214 may be configured similarly as any of the jet manifolds disclosed herein.

Although the water pump 216 is shown in one location receiving coolant from the jet manifold 214 and supplying coolant to the radiator 218, the water pump 216 may be in a different location. Another example is shown in FIG. 6. The water pump 216 may be implemented as a centrifugal pump.

The air flow circuit 204 may include an intake valve assembly 230, the engine 210, the EGR valve 222, the one or more intercoolers 224, 226, and a turbo 232. Outside air is drawn into the intake valve assembly 230 and provided to the engine 210. Exhaust gas is directed from the engine 210 to the EGR valve 222 and the turbo 232. Exhaust gas may exit the EGR valve 222 and the turbo and be supplied to and cooled by the intercoolers 224, 226. The cooled exhaust gas is directed from the intercoolers 224, 226 to the intake valve assembly 230 and then supplied to the engine 210.

The oil cooling circuit 206 includes the oil cooler 227 and other oil circuit devices and/or components 235, which may include a thermostat, an oil filter, a check valve, etc. The oil cooler 227 cools oil being circulated between the engine 210 and the oil cooler 227.

A control module 240 may be included and control operation of one or more components of the circuits 202, 204, 206. This may include, for example, controlling position of a throttle valve of the intake valve assembly 230. As another example, the control module 240 may control states of one or more valves, the water pump 216, etc. based on outputs of one or more sensors 242 (e.g., temperature sensors). The temperature sensors may detect temperature of the engine 210, coolant within the coolant circuit 202, temperature within a cabin of the vehicle, outside temperature, etc. The one or more valves may be included in the cooling circuit 202 and be controlled to control flow and/or pressure of coolant throughout the cooling circuit 202.

In FIG. 2, solid lines 250 refer to coolant conduits. Dashed lines 252 refer to air and/or gas lines. Dashed lines 254 refer to electrical signal lines. Dashed lines 256 refer to oil lines.

Figure 3:
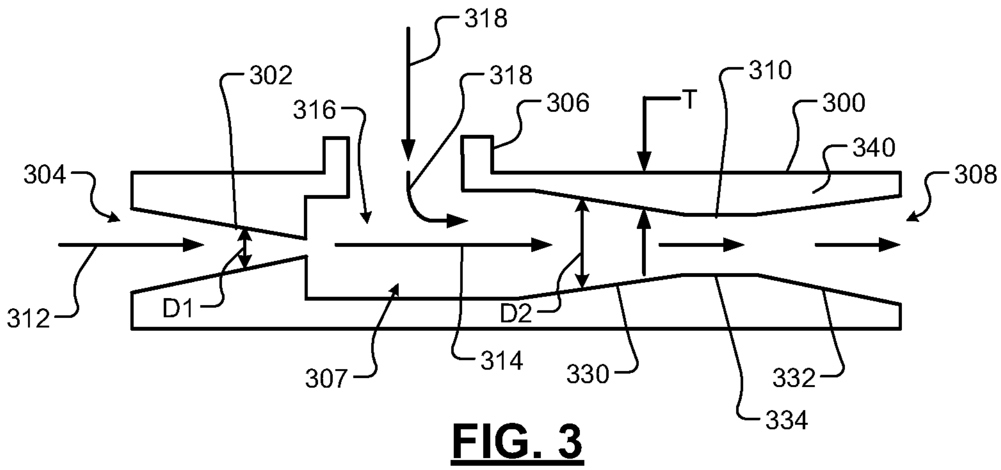
FIG. 3 is a side cross-sectional view of an example jet manifold including a venturi and having two inputs and a single output in accordance with the present disclosure.

FIG. 3 shows a jet manifold 300 including a nozzle 302 and having two inputs (also referred to as inlet lines) 304, 306, an inner central cavity 307, a single output (or output conduit) 308, and a venturi 310. As used herein, a "line" may refer to a pipe, tube, hose and may be cylindrically shaped having an outer wall with inner and outer diameters. The thickness of the outer wall may vary in thickness or may have the same thickness along the length of the line.

A high-pressure flow, represented by arrow 312, of fluid (e.g., coolant) is supplied to the input 304 of the nozzle 302 of the jet manifold 300. The inner surface of the nozzle 302 is conically-shaped and narrows in diameter D1 from the input 304 to the inner central cavity 307. The nozzle 302 provides backpressure in flow of fluid received at the input 304 and increases pressure of the fluid to provide a high-pressure flow of fluid in the form of a jet stream, represented by arrow 314. Pressure of the fluid represented by arrow 314 is higher than the pressure of the fluid represented by arrow 312. The jet stream 314 passes across the outlet of the inlet line 306 and creates a low-pressure zone 316 in a mixing area, which creates a vacuum and draws fluid (e.g., coolant), represented by arrows 318, from the input 306. As a result, backflow of the fluid 318 is prevented and positive flow of the fluid 318 is provided to the outlet 308.

The high-pressure fluid 314 is passed through the venturi 310. The inner diameter of the venturi 310 may be set based on the application of the jet manifold. In the example shown, the inner diameter D2 of the body of the jet manifold 300 narrows to the venturi 310 and then diverges (or increases in diameter) out of and away from the venturi 310. The narrowing (or converging) portion of the body is designated 330 and the widening (or diverging) portion of the body is designated 332. The narrowest (or center) portion of the body is designated 334. Pressure of fluid out of the output 308 of the jet manifold 300 may be lower than the pressure of the fluid into the nozzle 302 and higher than the pressure of the fluid into the input 306. The venturi 310 mixes the flow streams provided in the cavity 307 and reduces the pressure of the fluid provided to the venturi 310. Thickness T of the wall 340 of the body of the jet manifold 300 increases for the narrowing portion 330, remains constant for the center portion 334, and decreases for the diverging portion 332. The inner diameter of the wall 340 increases and the thickness T decreases from an output of the venturi 310 to recover some pressure and prevent cavitation.

The streams of coolant received at the inputs 304, 306 of the jet manifold 300 may be at different temperatures. The temperature of the coolant out of the jet manifold 300 may be at an intermediate temperature between the temperatures of the coolant received at the inputs 304, 306.

As an example, the input 304 may receive coolant from an EGR valve and the input 306 may receive coolant from a heater core. The output 308 may supply coolant to a water pump.

Figure 4:
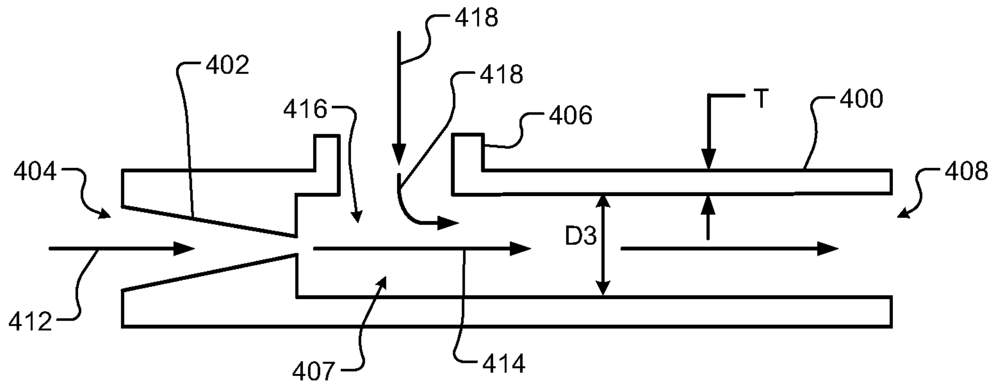
FIG. 4 is a side cross-sectional view of another example jet manifold without a venturi and having two inputs and a single output in accordance with the present disclosure.

FIG. 4 shows a jet manifold 400 without a venturi and including a nozzle 402 and having two inputs (also referred to as inlet lines) 404, 406, an inner cavity 407, and a single output (or output conduit) 408. A high-pressure flow, represented by arrow 412, of fluid (e.g., coolant) is supplied to the input 404 of the nozzle 402 of the jet manifold 400. The nozzle 402 is conically-shaped and narrows in diameter from the input 404 to the inner central cavity 407. The nozzle 402 provides backpressure in the fluid received at the input 404 and increases pressure of the fluid to provide a high-pressure flow of fluid in the form of a jet stream, represented by arrow 414. Pressure of the fluid represented by arrow 414 is higher than the pressure of the fluid represented by arrow 412. The jet stream 414 passes across the outlet of an inlet line (or conduit) connected to the inlet 406 and creates a low-pressure zone 416 in a mixing area, which creates a vacuum and draws fluid (e.g., coolant), represented by arrows 418, from the input 406. As a result, backflow of the fluid 418 is prevented and positive flow of the fluid 418 is provided to the outlet 408. The inner diameter D3 of the body of the jet manifold 400 remains constant downstream from the input 406. Similarly, the thickness T of the wall of the body remains the same downstream from the input 406.

As an example, the input 404 may receive coolant from an EGR valve and the input 406 may receive coolant from a heater core. The output 408 may supply coolant to a water pump.

Figure 5:
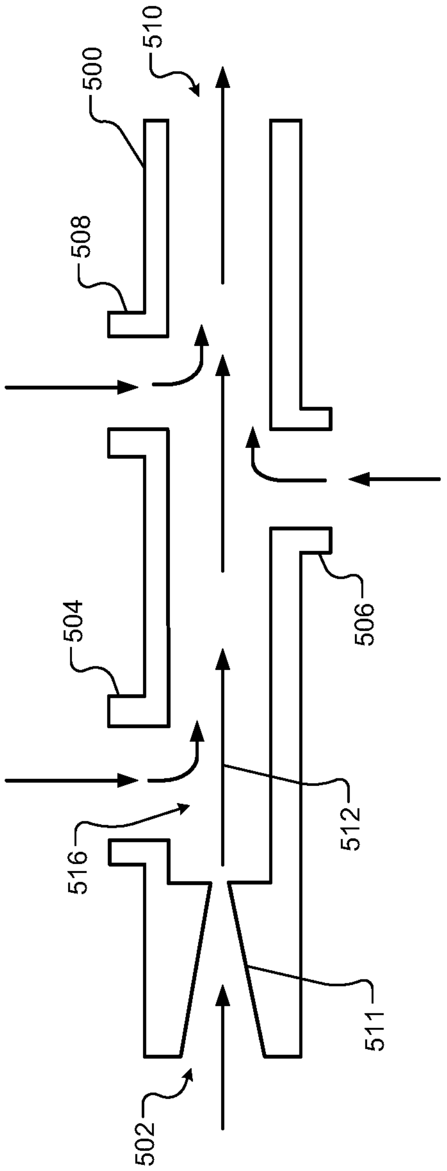
FIG. 5 is a side cross-sectional view of an example jet manifold having four inputs and a single output in accordance with the present disclosure.

FIG. 5 shows a jet manifold 500 having four inputs (also referred to as inlet lines) 502, 504, 506, 508 and a single output (or output conduit) 510. The jet manifold 500 may include a nozzle 511 similar to the nozzles 302, 402 of FIGS. 3-4 to create a jet stream 512 and low-pressure zone 516. The jet stream 512 draws fluid from the input 504 and may also draw fluid from one or more of the inputs 506 and 508. Although shown without a venturi, the jet manifold 500 may include a venturi, which may be downstream from one or more of the inputs 504, 506, 508, such as between the inputs 504, 506, between the inputs 506, 508, or downstream from the input 508. The thickness of the wall of the jet manifold may increase and decrease in the location of the venturi and the inner diameter of the wall may decrease and increase accordingly. This may be similar to the venturi arrangement shown in FIG. 3.

As an example, the input 502 may receive coolant from an EGR valve (e.g., the EGR valve 222 of FIG. 2), the input 504 may receive coolant from a heater core (e.g., the heater core 212 of FIG. 2), the input 506 may receive coolant from an oil cooler (e.g., the oil cooler 227 of FIG. 2), and the input 508 may receive coolant from a surge tank (e.g., the surge tank 220 of FIG. 2). The output 510 may supply coolant to a water pump (e.g., the water pump 216 of FIG. 2). In FIG. 5, the solid lines between components and devices refer to coolant conduits.

FIG. 6 shows a vehicle 600 including another example cooling circuit 602 with a jet manifold 604. The jet manifold 604 may be configured similarly as the jet manifolds disclosed herein. In the example shown, the jet manifold 604 has three inputs and one output. One of the three inputs may include a nozzle similar to the nozzles shown in FIGS. 3-5. The other two inputs may not include a nozzle and fluid may be drawn from the other two inputs due to the jet stream created by the nozzle. In the example shown, the input having the nozzle may receive coolant from a heater core 606. The other two inputs may receive coolant from an EGR cooler 608 and an oil cooler 610. The output of the jet manifold 604 may be provided to a centrifugal pump 612 (or water pump).

The centrifugal pump 612 pumps coolant from the jet manifold 604 and a radiator 614 to an engine coolant jacket 616 of an engine 618, the EGR cooler 608, and the oil cooler 610. One or more conduits may extend from the centrifugal pump 612 to the engine 618 or from a manifold 619 connected between the centrifugal pump and the engine 618. The radiator 614 may be cooled using a cooling fan 617, which may be controlled by a control module, similar to the control module 240 of FIG. 2. A thermostat 620 may be connected to and/or in line with one or more conduits extending between the radiator 614 and the centrifugal pump 612. The radiator 614 may include and/or be connected to a transmission oil cooler 622. Coolant passes from the engine coolant jacket 616 to the heater core 606 and the radiator 614. One or more conduits may provide coolant from the engine 618 to a splitter 623 connected between i) the engine 618, and ii) the radiator 614 and heater core 606. Steam (or vapor) in the conduit connecting the engine 618 to the radiator 614 may be passed to a surge tank 624 and cooled. The cooled coolant in the surge tank 624 may be drawn from the surge tank 624 by the centrifugal pump 612.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including “connected,” “engaged,” “coupled,” “adjacent,” “next to,” “on top of,” “above,” “below,” and “disposed.” Unless explicitly described as being “direct,” when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean “at least one of A, at least one of B, and at least one of C.”

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term “module” or the term “controller” may be replaced with the term “circuit.” The term “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A cooling circuit comprising:
- a plurality of vehicle components configured to receive coolant, the plurality of vehicle components comprising a first vehicle component and a second vehicle component; and
- a jet manifold comprising
  - a venturi downstream from a cavity in a body of the jet manifold, the venturi being configured to reduce a pressure of coolant received from the cavity,
  - a first input configured to receive coolant from the first vehicle component,
  - a second input upstream from the venturi and configured to receive coolant from the second vehicle component, and
  - a nozzle upstream from the second input and configured to increase pressure of the coolant received at the first input to generate a jet stream and a low-pressure zone in the cavity, the low-pressure zone created by the jet stream drawing coolant from the second input.

2. The cooling circuit of claim 1, wherein:
- the first input receives a high-pressure fluid from the first vehicle component; and
- the second input receives a low-pressure fluid from the second vehicle component, the low-pressure fluid being at a lower pressure than the high-pressure fluid.

3. The cooling circuit of claim 1, wherein:
- the first vehicle component is an exhaust gas recirculation valve; and
- the second vehicle component is a heater core.

4. The cooling circuit of claim 1, wherein:
- the first vehicle component is a heater core; and
- the second vehicle component is one of an exhaust gas recirculation valve and an oil cooler.

5. The cooling circuit of claim 1, wherein the plurality of vehicle components comprises at least two of:
- an exhaust gas recirculation valve;
- a heater core; and
- an oil cooler.

6. The cooling circuit of claim 1, wherein the nozzle has an inner diameter that decreases in size from an inlet of the nozzle to an outlet of the nozzle.

7. The cooling circuit of claim 1, wherein at least one of i) an inner diameter of the jet manifold increases from an output of the venturi, and ii) a thickness of a wall of the jet manifold decreases from the output of the venturi to recover some pressure and prevent cavitation.

8. The cooling circuit of claim 1, wherein at least one of:
- an inner diameter of the jet manifold decreases to the venturi and increases from an output of the venturi; and
- a thickness of a wall of the jet manifold increases to the venturi and decreases from an output of the venturi.

9. The cooling circuit of claim 1, wherein the jet manifold comprises an output that supplies coolant to a pump.

10. The cooling circuit of claim 1, wherein the jet manifold comprises two or more inputs and a single output.

11. The cooling circuit of claim 1, wherein the jet manifold comprises three or more inputs and a single output.

12. The cooling circuit of claim 1, wherein:
- the jet manifold comprises a third input configured to receive coolant from a third vehicle component,
- wherein the venturi is downstream from the third input; and
- the jet stream creates another low-pressure zone in a cavity of the body of the jet manifold at the third input, the another low-pressure zone created by the jet stream draws coolant from the third input.

13. The cooling circuit of claim 1, wherein:
- the first input is at a first end of the jet manifold and directs fluid in a same direction as fluid flow out of the jet manifold; and
- fluid flow into the second input is perpendicular to the direction of fluid flow into and from the first input.

14. The cooling circuit of claim 1, wherein the nozzle is configured to increase pressure of the coolant received at the first input prior to the coolant flowing past the second input.

15. The cooling circuit of claim 1, wherein a diameter of the nozzle decreases in size along a portion of the cooling circuit in a direction of flow of the coolant and as the coolant approaches the second input.

16. The cooling circuit of claim 1, wherein;
- the jet stream is injected into the cavity upstream from the second input; and
- the second input injects coolant into the cavity upstream from a narrowing portion of the cavity leading to the venturi.

17. A cooling circuit comprising:
- an exhaust gas recirculation valve;
- a heater core; and
- a jet manifold comprising
  - a first input configured to receive coolant from the exhaust gas recirculation valve,
  - a second input configured to receive coolant from the heater core,
  - a nozzle upstream from the second input and configured to increase pressure of the coolant received from the exhaust gas recirculation valve to generate a jet stream and a low-pressure zone in a cavity of a body of the jet manifold, the low-pressure zone created by the jet stream drawing coolant from the second input, and
  - a venturi downstream from the cavity.

18. The cooling circuit of claim 17, wherein the jet manifold comprises a third input downstream from the second input and configured to receive coolant from a vehicle component, the vehicle component being different than the exhaust gas recirculation valve and the heater core.

19. A cooling circuit comprising:
- a heater core;
- an exhaust gas recirculation valve; and
- a jet manifold comprising
  - a first input configured to receive coolant from the heater core, a second input configured to receive coolant from the exhaust gas recirculation valve, a nozzle upstream from the second input and configured to increase pressure of the coolant received from the heater core to generate a jet stream and a low-pressure zone in a cavity of a body of the jet manifold, the low-pressure zone created by the jet stream drawing coolant from the second input, and a venturi downstream from the cavity.

20. The cooling circuit of claim 19, wherein the jet manifold comprises a third input downstream from the second input and configured to receive coolant from a vehicle component, the vehicle component being different than the exhaust gas recirculation valve and the heater core.

* * * * *